United States Patent
Harms (10) Patent No.: US 11,591,053 B2
(45) Date of Patent: Feb. 28, 2023

(54) LIFE RAFT SYSTEM FOR AN AIRCRAFT

(71) Applicant: AIRBUS HELICOPTERS DEUTSCHLAND GMBH, Donauworth (DE)

(72) Inventor: Stefan Harms, Tapfheim (DE)

(73) Assignee: AIRBUS HELICOPTERS DEUTSCHLAND GMBH, Donauworth (DE)

(*) Notice: Subject to any disclaimer, the term of this patent is extended or adjusted under 35 U.S.C. 154(b) by 229 days.

(21) Appl. No.: 17/177,454

(22) Filed: Feb. 17, 2021

(65) Prior Publication Data

US 2021/0339875 A1   Nov. 4, 2021

(30) Foreign Application Priority Data

Apr. 30, 2020  (EP) .................................... 20400006

(51) Int. Cl.
| | |
|---|---|
| *B64D 25/16* | (2006.01) |
| *B63B 79/40* | (2020.01) |
| *B63B 22/00* | (2006.01) |
| *B63B 22/04* | (2006.01) |
| *B64D 25/18* | (2006.01) |
| *B63C 9/04* | (2006.01) |

(52) U.S. Cl.
CPC ............ *B63B 79/40* (2020.01); *B63B 22/003* (2013.01); *B63B 22/04* (2013.01); *B64D 25/16* (2013.01); *B64D 25/18* (2013.01); *B63C 2009/042* (2013.01)

(58) Field of Classification Search
CPC ........ B64D 25/18; B64D 25/16; B63B 22/04; B63B 22/003; B63B 79/40; B63C 2009/042
See application file for complete search history.

(56) References Cited

U.S. PATENT DOCUMENTS

| | | | |
|---|---|---|---|
| 2,510,843 A | 6/1950 | Oliver | |
| 6,558,218 B1 * | 5/2003 | Hansen | ..................... B63C 9/01 |
| | | | 441/80 |
| 6,644,596 B1 | 11/2003 | Jurlina et al. | |

(Continued)

FOREIGN PATENT DOCUMENTS

| | | |
|---|---|---|
| EP | 0119333 B1 | 9/1984 |
| EP | 2610171 A1 | 7/2013 |

(Continued)

OTHER PUBLICATIONS

European Search Report for European Application No. EP 20400006. 1, Completed by the European Patent Office, dated Oct. 15, 2020, 6 pages.

*Primary Examiner* — Tye William Abell
(74) *Attorney, Agent, or Firm* — Brooks Kushman P.C.

(57) ABSTRACT

A life raft system for an aircraft, comprising a storage container; an inflatable life raft that is stored in the storage container in normal operation mode, an inflation device for inflating the inflatable life raft in an emergency mode, and a control unit for activating the inflation device in the emergency mode; wherein the control unit comprises a floatable control buoy with an activation member that is operable for activating the inflation device, wherein the floatable control buoy is provided for operation at a predetermined distance remote from an associated aircraft in an emergency mode.

12 Claims, 5 Drawing Sheets

(56) References Cited

U.S. PATENT DOCUMENTS

| | | | |
|---|---|---|---|
| 7,434,600 B1 | 10/2008 | Swierkocki et al. | |
| 10,829,231 B2 * | 11/2020 | Haugeberg | B64D 25/16 |
| 2010/0163763 A1 | 7/2010 | Bradford | |
| 2010/0210157 A1 | 8/2010 | Koulouris | |
| 2014/0284420 A1 * | 9/2014 | Hainsworth | B63C 9/01 |
| | | | 441/83 |
| 2018/0057153 A1 * | 3/2018 | Rappl | B64D 25/18 |

FOREIGN PATENT DOCUMENTS

| | | |
|---|---|---|
| EP | 2976256 A2 | 1/2016 |
| GB | 2097732 A | 11/1982 |
| WO | 2014186046 A2 | 11/2014 |
| WO | 2014186046 A3 | 1/2015 |

* cited by examiner

LIFE RAFT SYSTEM FOR AN AIRCRAFT

CROSS-REFERENCE TO RELATED APPLICATIONS

This application claims priority to European patent application No. EP 20400006.1 filed on Apr. 30, 2020, the disclosure of which is incorporated in its entirety by reference herein.

BACKGROUND OF THE INVENTION

(1) Field of the Invention

The present invention is related to a life raft system for an aircraft. The invention is further related to an aircraft having such a life raft system.

(2) Description of Related Art

If aircrafts are foreseen for flight missions over areas of sea, emergency situations may occur in which the aircrafts must ditch into the water. The term "ditching" means that the aircrafts perform a more or less controlled landing in the water. In order to prevent at least sinking of ditched aircrafts, they must at least be equipped with a suitable emergency floatation system that is activated upon ditching of the aircraft into the water, as e.g. described in the document U.S. Pat. No. 7,434,600 B1.

In case of rotary wing aircrafts, such as helicopters, which are e.g. used to accomplish offshore operations, externally installed life rafts for passengers of the helicopters are generally provided and stored in special containers mounted on the helicopters. The life rafts are usually installed close to respective passenger doors of the helicopters between associated emergency floatation bags, and they are integrated somewhere in the lower fuselages of the helicopters. After ditching of such helicopters in upright orientation, deployment of respective life rafts will be initiated from the cockpit or cabin side mechanically or electrically.

However, a ditched helicopter may capsize immediately after its ditching into water, in particular due to wind and waves. As the occupants of a capsized helicopter must quickly leave the helicopter through predetermined emergency exits, usually an external release handle for releasing a given life raft from a lower fuselage of the capsized helicopter is provided. The external release handle is an additional mechanical handle that is installed either on the lower side of an associated life raft container or close to the associated life raft container in the lower fuselage. This external release handle, which is also referred to as "backup release handle", must be reached and operated manually. Depending on current sea conditions, however, the external release handle may be located over or under the water surface.

In an emergency, occupants of a ditched helicopter may be required to swim after evacuation from the ditched helicopter and they must reach the external release handle to release a given lift raft of the ditched helicopter. However, reaching of the external release handle may be a difficult exercise, in particular because of uncontrolled movements of the ditched helicopter due to waves, which may be rather high in rough open sea areas.

Moreover, the occupants are normally equipped with dry suit and life preserver, at least if the ditched helicopter is used to accomplish offshore operations. A deployed life preserver over a dry suit limits however an overall mobility of a respective swimming person significantly, which renders reaching of the external release handle even more difficult and dangerous, and the swimming person(s) may be injured when attempting to reach the external release handle.

Furthermore, the external release handle as such may be difficult to reach, e.g. due to a respective helicopter design with a smooth loft without protruding means, such as steps or handles, which are frequently omitted for style reasons. As a result, the swimming person(s) may not be able to reach the external release handle and to release the given lift raft of the ditched helicopter.

Another danger exists during deployment of the given life raft itself. In fact, as soon as a swimming person has reached the external release handle, which is usually installed close to the life raft, and activated deployment of the life raft, the latter is deployed and could thereby hit and injure the swimming person.

Document US 2010/0163763 A1 describes a life raft with an inflation system that may be activated manually or automatically as a result of contact with water. The inflation system is mounted to the life raft and may be activated by operating an associated manual activation device, which is provided in the form of a pull handle. Alternatively, the inflation system may be activated by means of an automatic activation assembly.

Document U.S. Pat. No. 6,644,596 B1 describes a vacuum-packed inflatable life raft with an associated inflation system that is installed in an airplane. The inflation system may be activated by a pilot or another person via a cable that extends between the inflation system and a cockpit area of the airplane, or automatically through well-known mechanisms.

Document EP 0 119 333 B1 describes an inflatable flotation device, such as a life raft, with inflating means for inflating the device. The inflating means comprise a valve, a container for holding an inflating medium and said inflating medium, and a sealed vacuum package containing the inflatable flotation device as well as means for inflating the same, which is provided with at least one means for automatically and/or manually actuating the inflation of the device. The means for activating the inflation of the device are triggered by a pull force which acts automatically and/or manually on one or more connecting lanyards which are attached at one end to the actuation means and which lanyards extend through the vacuum package in such a manner as to preserve the integrity of the sealed vacuum package, while at the same time allowing the manual triggering of the actuation means with the exertion of a pull force of no more than about 7 to 15 kg.

Document EP 2 610 171 A1 describes an aircraft with an external life raft system outside a cabin that comprises an automatic system for water detection. More specifically, the external life raft system comprises life raft containers with associated life rafts on either side of a longitudinal aircraft axis, each life raft container having at least one water sensor and at least one vibration sensor. The external life raft system comprises electrical activation means for an automated activation of the life rafts by means of a logic circuit after a suitable analysis of data provided by the sensors.

Irrespective of all examples described above, it should be noted that since the year 2019 respective requirements related to ditching of aircrafts into water and subsequent survivability of ditched aircraft occupants in the water were increased in terms of safety. In parallel, underlying standards such as the European Technical Standard Orders (ETSOs) were reworked in different working groups. The aim of all these working groups, which were organized by the competent authorities such as the European Union Aviation Safety Agency (EASA) and the Civil Aviation Authority (CAA), was to increase a respective safety level for ditching equipment of aircrafts, such as life raft systems.

BRIEF SUMMARY OF THE INVENTION

It is, therefore, an object of the present invention to provide a new life raft system for an aircraft with an increased safety level, which may be easily and reliably activated after ditching of the aircraft by a person swimming in the surroundings of the aircraft.

This object is solved by a life raft system for an aircraft that comprises the features of claim 1. More specifically, according to the present invention the life raft system for an aircraft comprises a storage container, an inflatable life raft that is stored in the storage container in normal operation mode, an inflation device for inflating the inflatable life raft in an emergency mode, and a control unit for activating the inflation device in the emergency mode. The control unit comprises a floatable control buoy with an activation member that is operable for activating the inflation device. The floatable control buoy is provided for operation at a predetermined distance remote from an associated aircraft in an emergency mode.

The inventive life raft system provides the opportunity to deploy the inflatable life raft remotely by operating the activation member of the floatable control buoy. The floatable control buoy is advantageously separate, external to and independent of the inflatable life raft and floats in the emergency mode preferably on the surface of the water close to the aircraft. By way of example, the floatable control buoy may have a diameter of approximately 20 cm and a height of approximately 30 cm.

Persons that are swimming in the water in the proximity of the aircraft after ditching of the aircraft may, thus, grab the floatable control buoy and activate inflation of the inflatable life raft, preferably electrically. Accordingly, these persons are not required to approach the fuselage of the ditched aircraft and, therefore, will not endanger themselves by the possibly unsteady ditched aircraft. Furthermore, by being close to the floatable control buoy, they will not be in the direct deployment zone of the inflatable life raft, which prevents them from injuries that may e.g. result from opening doors or covers of an associated life raft container. An overall safety level and a respective survivability level of the persons that are swimming in the water in the proximity of the ditched aircraft are, thus, significantly increased.

More particularly, as the persons that use the floatable control buoy are not required to approach the fuselage of a ditched aircraft, they are also not required to "climb" on the eventually capsized fuselage to reach a given conventional backup release handle on the lower fuselage side of the ditched aircraft. In addition, these persons are not required to swim between the deployed life raft and the ditched aircraft. This further increases the overall safety level and the respective survivability level of the persons that are swimming in the water in the proximity of the ditched aircraft.

The floatable control buoy may advantageously be linked to a respective automatic deployment system of an emergency floatation system (EFS) of the ditched aircraft such that the floatable control buoy will preferably be triggered to be released by means of an electrical trigger signal coming from associated water immersion sensors. These sensors are preferentially part of the EFS and create a respective electrical trigger signal as soon as they detect water. Thus, a locking device that may be provided to hold the floatable control buoy in normal operation mode in place, may be activated to unlock the floatable control buoy. The locking device preferably includes an electrical ejection device provided in a respective external life raft storage container. Preferentially, the locking device is provided with a stud which is mounted at least on one side of the floatable control buoy and secured with a plunger, e.g. a bolt.

Upon ditching of the aircraft, the water immersion sensors preferably generate an electrical trigger signal, which is preferentially a discrete signal. Powered by emergency electrical power, which may be provided by the aircraft, and triggered by the discrete signal coming from the water immersion sensors, a solenoid of the locking device moves the plunger. By moving the plunger, the stud will be unlocked. A spring of the ejection device, in particular a compression spring, may then push the floatable control buoy away from the external life raft storage container and, consequently, away from the ditched aircraft.

In other words, the preferably highly visible floatable control buoy will preferentially be released as soon as the aircraft has contact with water. However, only the floatable control buoy will be released from the aircraft, while the remaining components of the inventive life raft system, such as the inflatable life raft, the inflation device etc. remain in the storage container until the inflatable life raft will be deployed via activation of the activation member of the floatable control buoy.

Thus, in contrast to well-known conventional automatic deployment systems, only the floatable control buoy will initially be released automatically. This allows a swimming person in the proximity of a ditched aircraft to activate the inventive life raft system from a more or less random position in the water.

Preferably, the floatable control buoy is connected via a defined connection line/electrical cable with the ditched aircraft. It preferentially includes water activated light for visibility also at night in water. Furthermore, due to a floating body the floatable control buoy will always stay on the water surface. Moreover, a grip and, more particularly, a hand grip and/or a grasp line may at least be provided on one outer side of the floatable control buoy so that the floatable control buoy may be grasped easily.

Advantageously, the floatable control buoy includes on its top side and on its lower side an electrical switch, and furthermore an associated battery, which activates inflation of the inflatable life raft upon being pressed. The electrical switch is preferably designed with dimensions that allow a person to operate it, i.e. push it also with gloves.

According to one aspect, the floatable control buoy is connected to a deployable connection line having a length of at least 2 m.

According to one aspect, the length of the deployable connection line is comprised in a range from 2 m to 5 m.

Thus, the floatable control buoy may advantageously float outside of a direct deployment zone of the inflatable life raft. The latter may, thus, deploy without injuring a person that operates the floatable control buoy. More particularly, this person is advantageously also sufficiently spaced apart from the ditched aircraft, which may unpredictably move due to wind and waves, which may be rather high in rough open sea areas.

According to one aspect, the deployable connection line comprises an integrated electrical cable that is adapted for electrically connecting the activation member of the floatable control buoy to the inflation device. The activation member is implemented as an electrical switch.

According to one aspect, the deployable connection line is rigidly mounted to an associated storage compartment that accommodates the floatable control buoy in the normal operation mode, for coupling the floatable control buoy to the associated storage compartment.

According to one aspect, the associated storage compartment is integrated into the storage container.

According to one aspect, a locking device is provided for locking the floatable control buoy in the associated storage compartment in the normal operation mode.

According to one aspect, the locking device comprises a movable plunger that is adapted for locking a stud in an associated accommodation in the normal operation mode. The stud is an integral part of, or rigidly mounted to, the floatable control buoy.

According to one aspect, the locking device comprises a solenoid which is activatable for moving the moveable plunger in an emergency mode such that the moveable plunger releases the stud.

According to one aspect, the associated storage compartment is separated from a locking device compartment by means of a partitioning wall. The stud protrudes in the normal operation mode through an opening provided in the partitioning wall into the locking device compartment.

According to one aspect, an ejection device is provided that is configured to eject the floatable control buoy from the associated storage compartment in an emergency mode.

According to one aspect, the ejection device comprises a compression spring that applies a predetermined spring force between the floatable control buoy and the partitioning wall.

According to one aspect, the floatable control buoy comprises at least one grip.

According to one aspect, the floatable control buoy comprises at least one light source.

The present invention further relates to an aircraft, in particular a rotary wing aircraft, with a fuselage and a life raft system as described above, wherein the storage container of the life raft system is rigidly mounted to the fuselage.

Preferably, the floatable control buoy, the inflatable life raft, and the inflation device such as e.g. a pressure cylinder, are stored in the storage container, which is preferentially mounted on a lower side of the rotary wing aircraft, such as e.g. a helicopter, in particular a helicopter for offshore operations. In addition, preferably an emergency locator transmitter (ELT) and an emergency pack are also stored in the storage container. Furthermore, the stud of the locking device is preferably mounted on top of the floatable control buoy and in the storage compartment of the floatable control buoy, a spring unit such as e.g. a compression spring is preferentially mounted on the partitioning wall. The partitioning wall preferably separates the storage compartment from the locking device compartment. By installation of the floatable control buoy in its storage compartment, it is preferably pressed against the compression spring which is biased between the partitioning wall and the floatable control buoy. In its predetermined end position, the stud of the floatable control buoy is preferably lead through a breakthrough in the partitioning wall and preferentially engages with the moveable plunger, such as e.g. a bolt, which is preferably part of the locking device mounted on the opposite side of the partitioning wall.

In an exemplary operation of the rotary wing aircraft, the floatable control buoy is preferably retained in the storage container until one or more respective water immersion sensors activate the locking device automatically upon ditching of the rotary wing aircraft into water. Preferably, the one or more water immersion sensors generate an electrical discrete trigger signal. Powered by electrical power, which is e.g. provided by the rotary wing aircraft, and triggered by the electrical discrete trigger signal coming from the one or more water immersion sensors, preferably the solenoid is activated in the locking device which preferentially moves the moveable plunger from an associated locking position to a predetermined release position. By moving the moveable plunger, the stud of the floatable control buoy is preferably unlocked and the biased compression spring preferentially flings the floatable control buoy out of its storage compartment and away from the rotary wing aircraft.

It should be noted that the various different aspects of the present invention which are described above should not be understood as separate, isolated embodiments. Instead, any feasible combinations of the different aspects are likewise contemplated.

BRIEF DESCRIPTION OF THE DRAWINGS

Illustrative embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
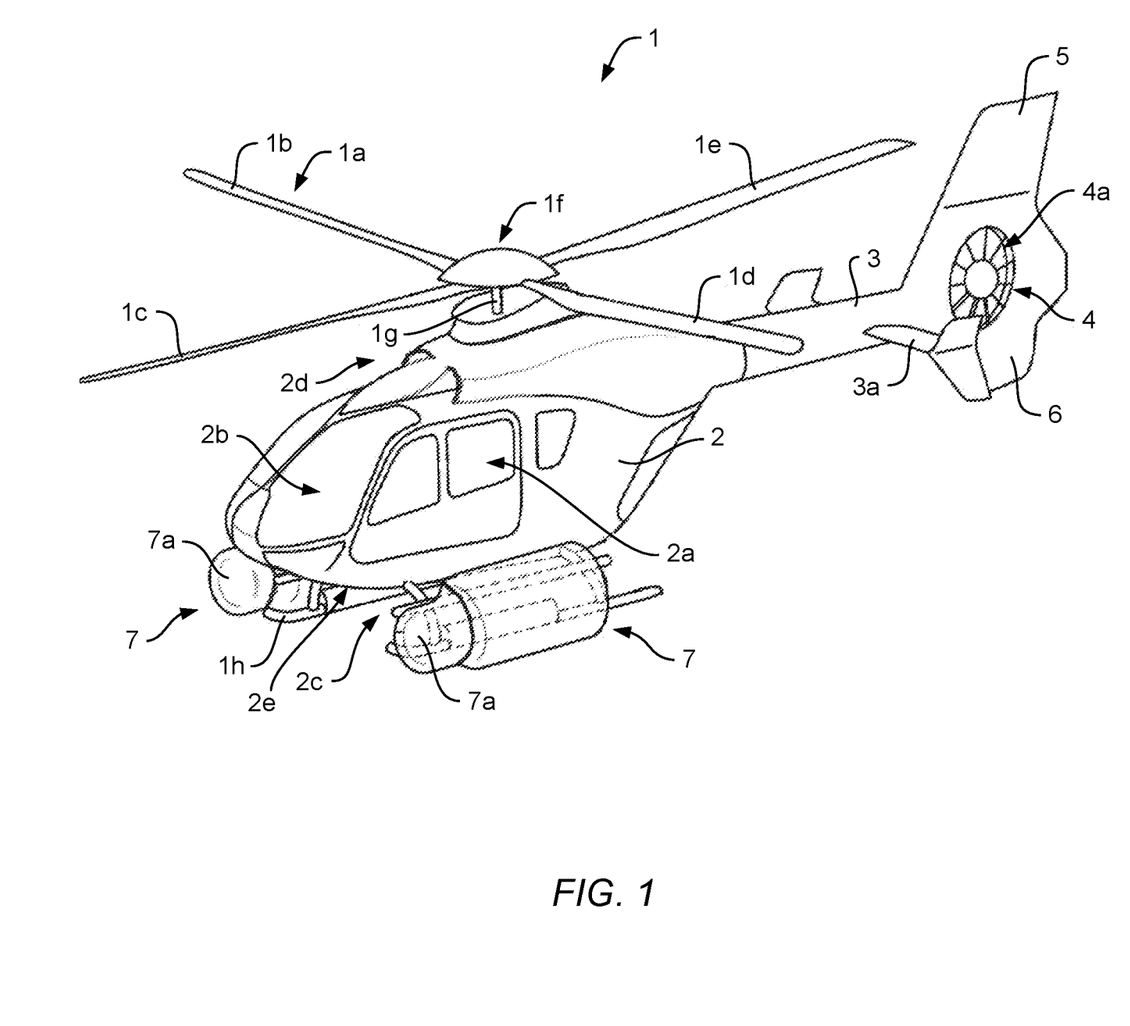
FIG. 1 shows a perspective view of an aircraft according to the present invention.

FIG. 1 shows an aircraft 1 according to one aspect that is exemplarily illustrated as a rotary wing aircraft and, more particularly, as a helicopter. Thus, for purposes of simplicity and clarity, the aircraft 1 is hereinafter referred to as the "helicopter 1".

Illustratively, the helicopter 1 comprises at least one multi-blade main rotor 1a for providing lift and forward or backward thrust during operation. The at least one multi-blade main rotor 1a preferably comprises a plurality of rotor blades 1b, 1c, 1d, 1e that are mounted at an associated rotor head 1f to a rotor shaft 1g, which rotates in operation of the helicopter 1 around an associated rotor axis.

Preferably, the helicopter 1 comprises a fuselage 2 that exemplarily defines a cabin 2a and a cockpit 2b. Illustratively, the fuselage 2 comprises a lower fuselage region 2c with an underside wall 2e, and an upper fuselage region 2d. The lower fuselage region 2c is preferably connected to a landing gear 1h, which is exemplarily embodied as a skidtype landing gear. The upper fuselage region 2d preferably defines a roof of the helicopter 1, where the rotor head 1f is exemplarily arranged.

Illustratively, the fuselage 2 is connected to a tail boom 3 and exemplarily comprises at least one preferentially shrouded counter-torque device 4 configured to provide counter-torque during operation, i.e. to counter the torque created by rotation of the at least one multi-blade main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a vertical stabilizer 5 that is provided with a bumper 6. Illustratively, the tail boom 3 is also provided with a suitable horizontal stabilizer 3a.

According to one aspect, the helicopter 1 is provided to accomplish flight missions over water areas, such as e.g. offshore operations, and comprises an emergency floatation system 7. The emergency floatation system 7 is preferably adapted for being activated upon an emergency landing of the helicopter 1 on water, for preventing at least sinking of the helicopter 1. Activation of the emergency floatation system 7 is preferentially triggered operator-independently, i.e. automatically.

Preferably, the emergency floatation system 7 comprises one or more float bags 7a, in particular inflatable float bags. Illustratively, two float bags 7a are provided. However, it should be noted that the number of provided inflatable float bags is usually dependent on a size and weight of the helicopter 1, as described below with respect to FIG. 2.

By way of example, the emergency floatation system 7 can be realized by using inflatable and inflating components that are currently already used for implementing conventional emergency floatation systems. Such components preferably comprise conventional float bags together with a pressurized gas cylinder or a gas generator including an electrical activation system located within a container. However, such conventional emergency floatation systems are well-known to the person skilled in the art, so that a more detailed description thereof can be omitted for brevity and conciseness.

The float bags 7a are preferably inflated upon activation of the emergency floatation system 7. Exemplarily, the float bags 7a are provided at least partly at the lower fuselage region 2c and, preferentially, mounted to the landing gear 1h. However, instead of mounting the float bags 7a to the landing gear 1h, they may alternatively be mounted directly to the fuselage 2 at the lower fuselage region 2c.

Figure 2:
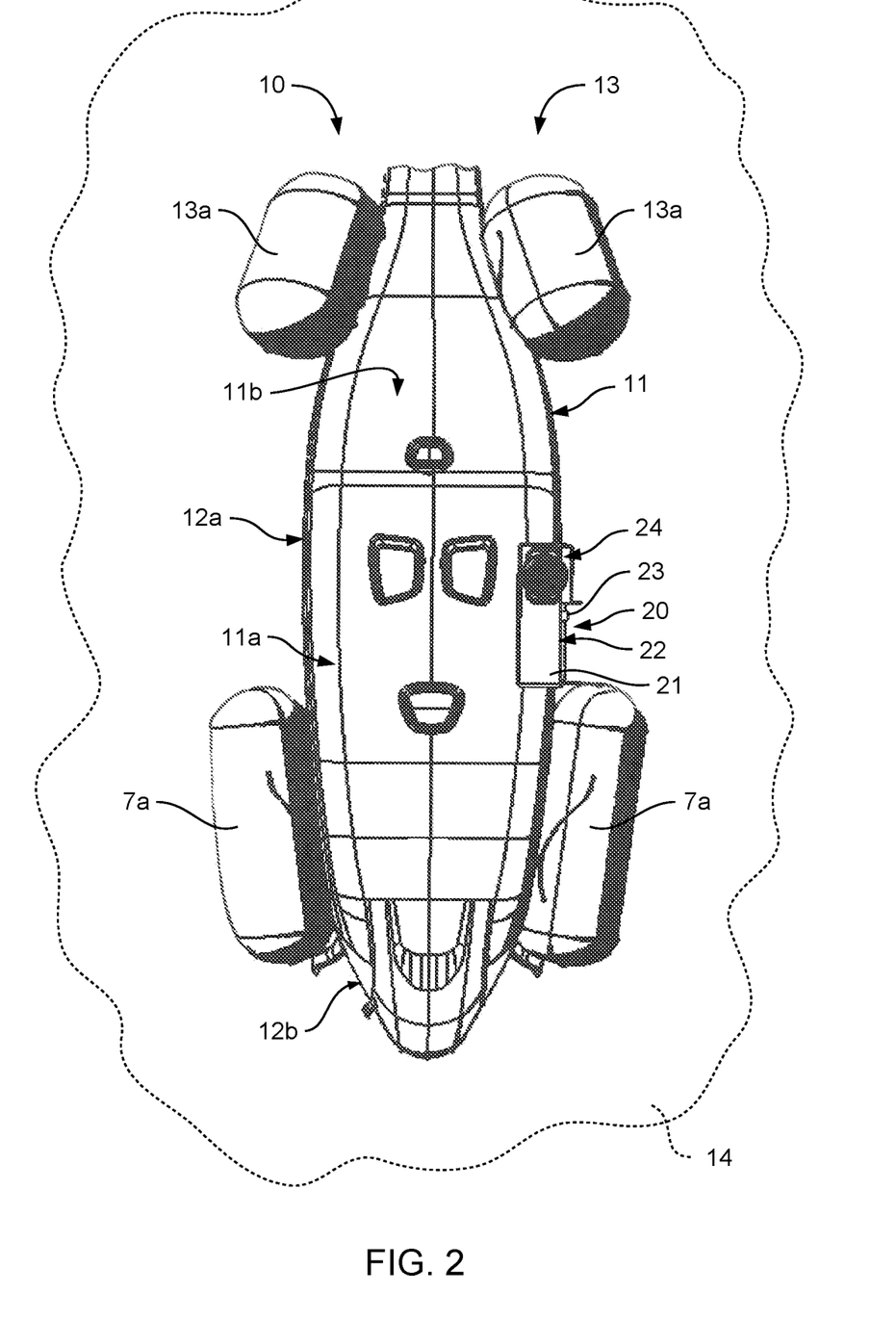
FIG. 2 shows a perspective view of an aircraft that is capsized in a water area, the aircraft comprising a life raft system with a floatable control buoy according to the present invention.

FIG. 2 shows an aircraft 10 that is also exemplarily illustrated as a rotary wing aircraft and, more particularly, as a helicopter. Thus, for purposes of simplicity and clarity, the aircraft 10 is hereinafter referred to as the "helicopter 10".

Illustratively, the helicopter 10 comprises a fuselage 11 with a lower fuselage region 11a having an underside wall 11b. The fuselage 11 exemplarily defines a cabin 12a and a cockpit 12b. However, for simplicity and clarity of the drawing, a more detailed illustration and/or labelling of further well-known components of the helicopter 10, such as e.g. a tail boom and/or a landing gear, is omitted.

Similar to the helicopter 1 of FIG. 1, the helicopter 10 is preferably provided to accomplish flight missions over water areas, such as e.g. offshore operations, and thus also comprises the emergency floatation system 7 of FIG. 1 with the two float bags 7a. However, by way of example the helicopter 10 is longer than the helicopter 1 of FIG. 1 and, thus, also heavier and, therefore, comprises an additional emergency floatation system 13 with two additional float bags 13a.

According to one aspect, the helicopter 10 is equipped with a life raft system 20 that comprises a storage container 21, an inflatable life raft 22 that is stored in the storage container 21 in normal operation mode, an inflation device 23 for inflating the inflatable life raft 22 in an emergency mode, and a control unit 24 for activating the inflation device 23 in the emergency mode. At least the inflatable life raft 22 and the inflation device 23 may be implemented by well-known components, including readily available conventional components, so that a more detailed description of these components can be omitted for brevity and conciseness.

Preferably, the life raft system 20 and, more particularly, the storage container 21 is integrated into, or rigidly mounted to, the fuselage 11 of the helicopter 10. Illustratively, the storage container 21 is arranged in the lower fuselage region 11a at the underside wall 11b.

By way of example, the helicopter 10 is illustrated in FIG. 2 in an emergency mode. More specifically, the helicopter 10 is shown after ditching into a water area 14, in which the helicopter 10 has illustratively capsized. Thus, the emergency floatation systems 7, 13 were activated and the float bags 7a, 13a were inflated such that the capsized helicopter 10 floats in the water area 14, illustratively with its underside wall 11b over the water surface of the water area 14.

Figure 3:
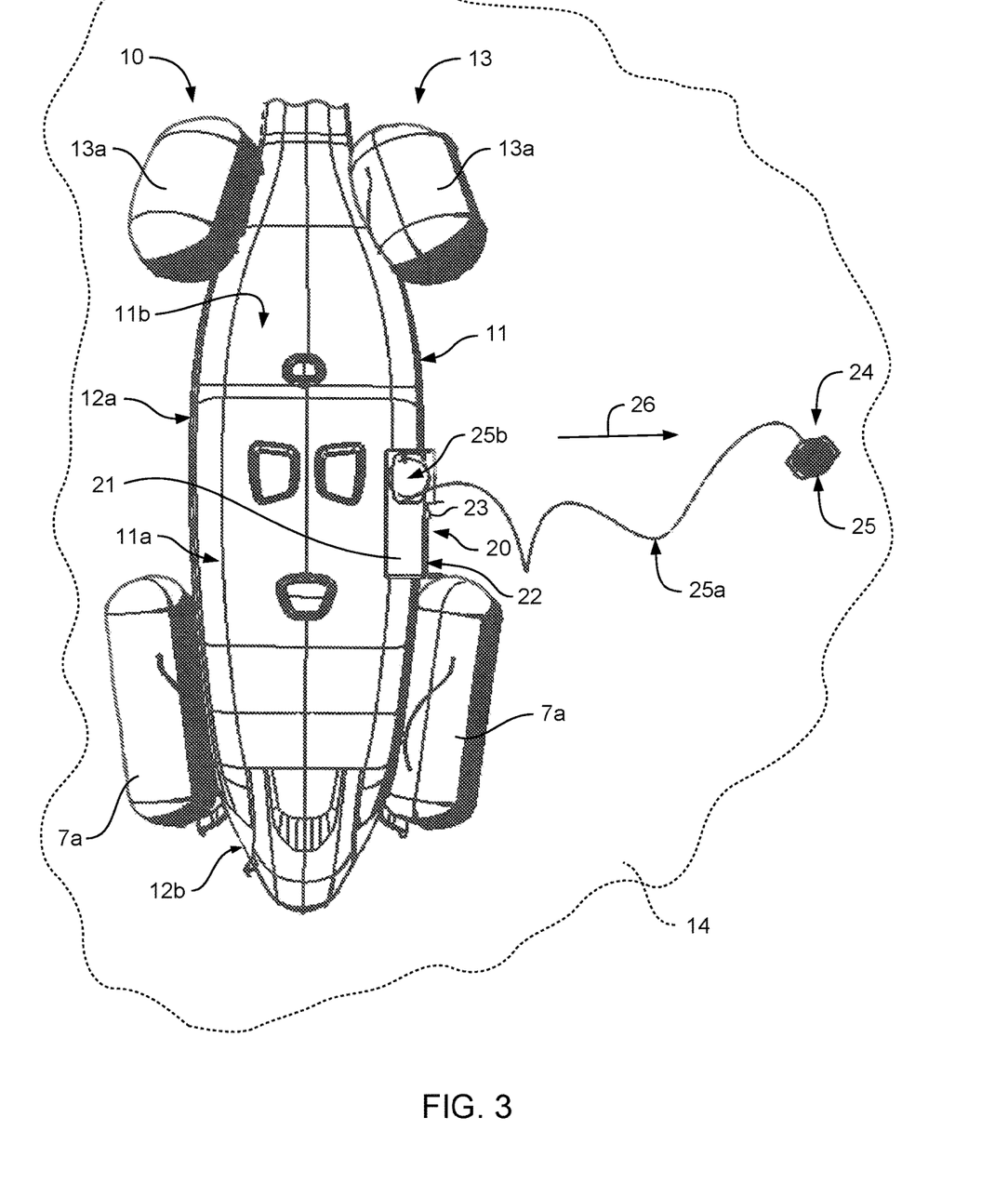
FIG. 3 shows the capsized aircraft of FIG. 2 with the life raft system and the floatable control buoy that is floating in the water area.

FIG. 3 shows the capsized helicopter 10 of FIG. 2 in the emergency mode, which floats in the water area 14, illustratively with its underside wall 11b over the water surface of the water area 14. The capsized helicopter 10 is equipped with the life raft system 20 of FIG. 2, which comprises the storage container 21, the inflatable life raft 22, the inflation device 23, and the control unit 24.

According to one aspect, the life raft system 20 is further equipped with a floatable control buoy 25 that is provided to enable remote activation of the inflation device 23. The floatable control buoy 25 is preferably associated with, i.e. implements at least partly the control unit 24 and is provided for operation at a predetermined distance away from the capsized helicopter 10 in the emergency mode.

More specifically, the floatable control buoy 25 is preferably accommodated in an associated storage compartment 25b in the normal operation mode. The associated storage compartment 25b may be integrated into the storage container 21.

The floatable control buoy 25 is preferably connected to a deployable connection line 25a having a length of at least 2 m and, preferably, a length that is comprised in a range from 2 m to 5 m. The deployable connection line 25a may be rigidly mounted to the storage compartment 25b for coupling the floatable control buoy 25 to the storage compartment 25b. Preferably, the connection line 25a comprises an integrated electrical cable that is adapted for electrically connecting an activation member (27a if FIG. 6) of the floatable control buoy 25 to the inflation device 23.

According to one aspect, the floatable control buoy 25 is ejected from the storage compartment 25b in the emergency mode, illustratively in an ejection direction 26. More specifically, the floatable control buoy 25 is preferably retained in the storage compartment 25b until one or more associated water immersion sensors detect ditching of the helicopter 10 into the water area 14 and/or at least a partial immersion of the storage container 21 in the water. In this case, the one or more associated water immersion sensors may generate an electrical trigger signal, which is preferably a discrete signal and which results in activation of a suitable ejection device (30 in FIG. 6) that ejects the floatable control buoy 25 from the storage compartment 25b.

Figure 4:
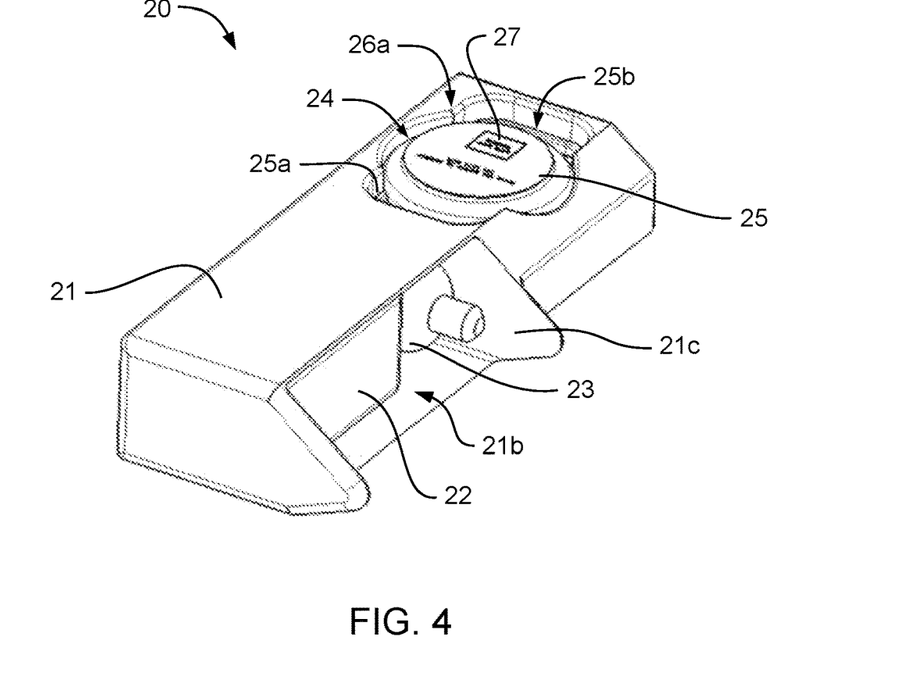
FIG. 4 shows a perspective view of the life raft system of FIG. 2 and FIG. 3.

FIG. 4 shows the life raft system 20 of FIG. 2 and FIG. 3 in the normal operation mode, with the storage container 21, the inflatable life raft 22, the inflation device 23, and the control unit 24. According to FIG. 3, the control unit 24 comprises the floatable control buoy 25 that is coupled via the deployable connection line 25a to the storage compartment 25b of the storage container 21 and, thus, to the storage container 21. As described above, the floatable control buoy 25 is illustratively accommodated in the storage compartment 25b of the storage container 21 and exemplarily comprises an activation member cover 27.

According to one aspect, the storage compartment 25b is separated by means of a compartment partitioning wall 21c from a life raft compartment 21b. Preferably, at least the inflatable life raft 22 is accommodated in the life raft compartment 21b in the normal operation mode. By way of example, the inflation device 23 is also accommodated in the life raft compartment 21b, but may alternatively also be accommodated in a further separate compartment or in the storage compartment 25b.

Illustratively, an ejection side 26a of the life raft system 20 is shown in FIG. 4. This ejection side 26a preferably faces away from the lower fuselage region 11a, i.e. the underside wall 11b, of the helicopter 10 of FIG. 2 and FIG. 3. In order to permit ejection of the floatable control buoy 25, the storage compartment 25b is preferentially open at the ejection side 26a.

Figure 5:
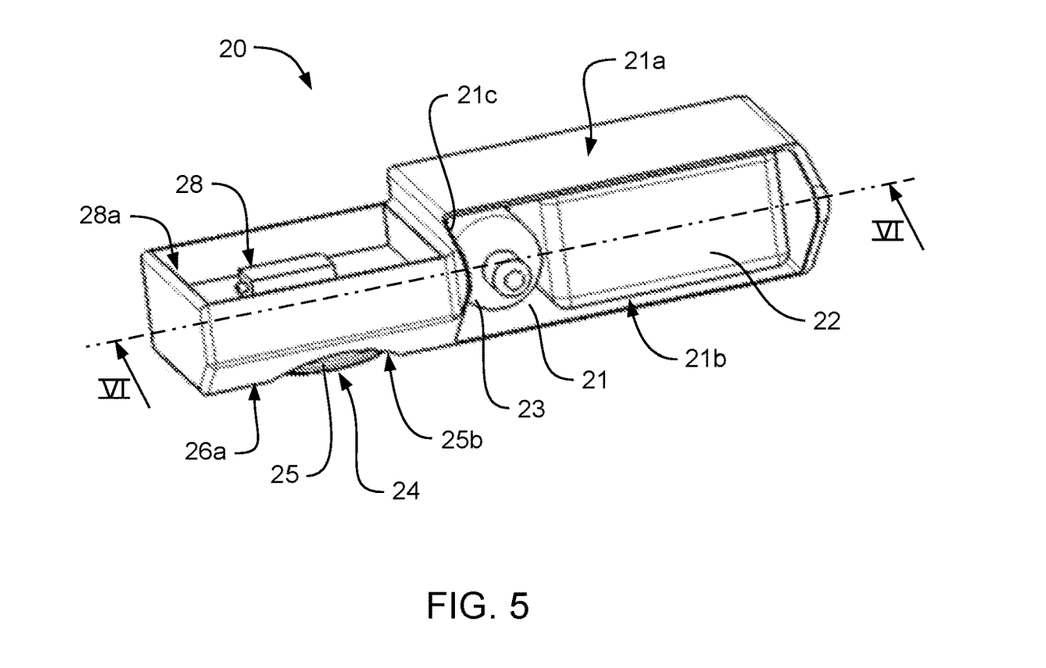
FIG. 5 shows another perspective view of the life raft system of FIG. 4.

FIG. 5 shows the life raft system 20 of FIG. 4 in the normal operation mode, with the storage container 21, the inflatable life raft 22, the inflation device 23, and the control unit 24 that comprises the floatable control buoy 25. Illustratively, the inflatable life raft 22 and the inflation device 23 are accommodated in the life raft compartment 21b, while the floatable control buoy 25 is accommodated in the storage compartment 25b that is separated by means of the compartment partitioning wall 21c from the life raft compartment 21b.

In contrast to FIG. 4 that illustrates the ejection side 26a of the life raft system 20, FIG. 5 further illustrates a fuselage facing side 21a of the life raft system 20, i.e. of the storage container 21. At the fuselage facing side 21a, preferably a locking device compartment 28a is provided that accommodates a locking device 28. According to one aspect, the locking device 28 is provided for locking the floatable control buoy 25 in the storage compartment 25b in the normal operation mode, as described below with reference to FIG. 6.

Figure 6:
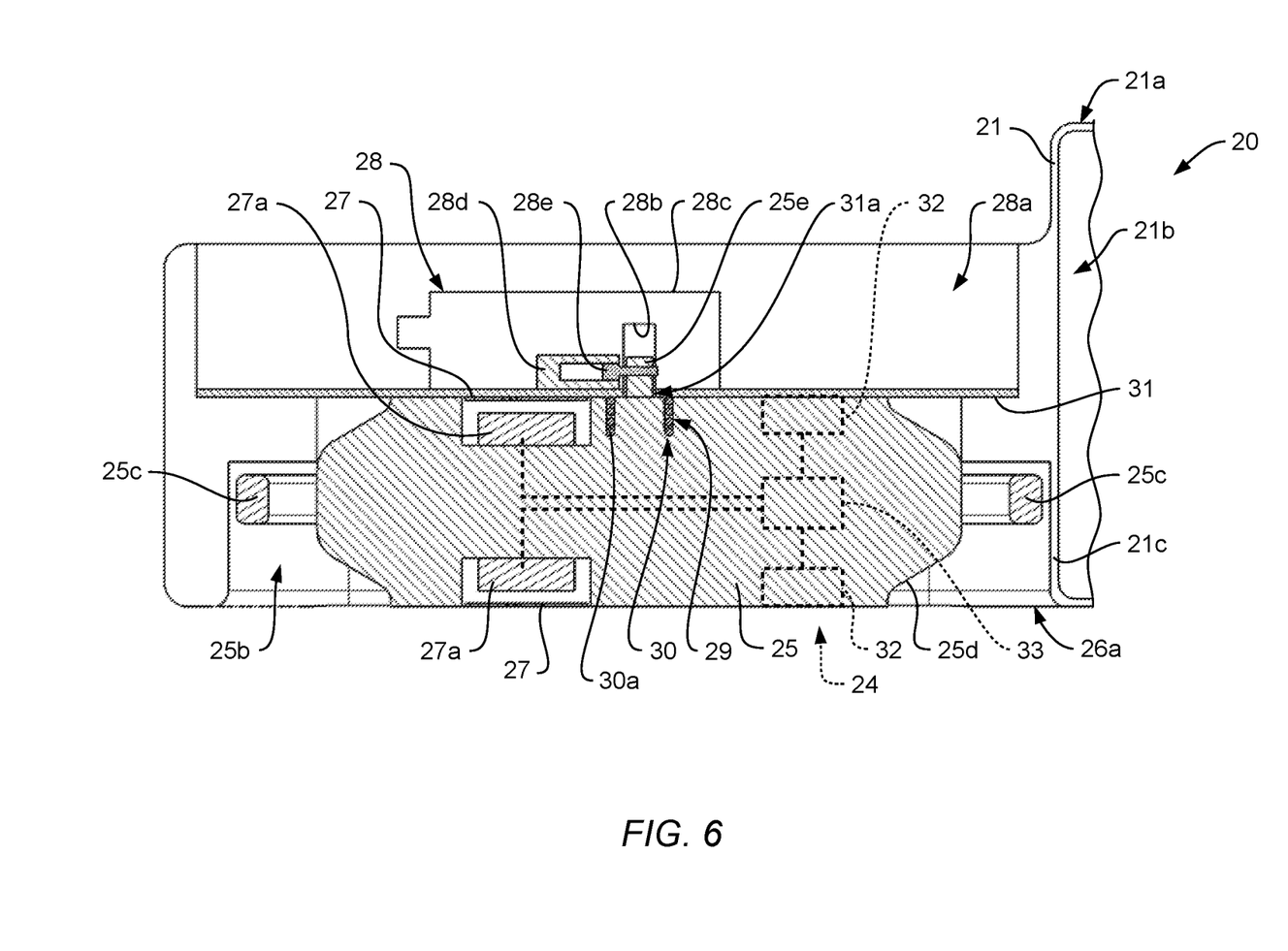
FIG. 6 shows a sectional view of the life raft system of FIG. 4 and FIG. 5, seen along a cut line VI-VI of FIG. 5.

FIG. 6 shows the life raft system 20 of FIG. 4 and FIG. 5 in the normal operation mode, with the storage container 21 that includes the life raft compartment 21b that is separated by means of the compartment partitioning wall 21c from the storage compartment 25b, wherein the floatable control buoy 25 is accommodated, and that further includes the locking device compartment 28a which accommodates the locking device 28. However, in contrast to FIG. 4 and FIG. 5 the life raft compartment 21b is not illustrated in more detail, for simplicity and clarity of the drawing.

According to one aspect, the floatable control buoy 25 has a housing 25d that accommodates at least one activation member that is operable for activating the inflation device 23 of FIG. 2 to FIG. 5. The at least one activation member is preferably covered by the activation member cover 27 of FIG. 4, which may visualize the positioning of the at least one activation member, describe its intended use and protect it from undesired operation.

By way of example, the floatable control buoy 25 is equipped with two activation members 27a which are arranged on opposed sides of the housing 25d and which are each covered by an associated activation member cover 27. Each activation member 27a may e.g. be implemented as an electrical switch.

Preferably, the activation members 27a are connected to a power source, such as e.g. a battery 33 that may be accommodated in the housing 25d. Thus, in response to operation of one of the activation members 27a, an electrical signal is transmitted to the inflation device 23 of FIG. 2 to FIG. 5, e.g. via the electrical cable that is integrated into the connection line 25a of FIG. 3 as described above, such that the inflation device 23 is activated and inflates the inflatable life raft 22 of FIG. 2 to FIG. 5.

The battery 33 is preferably further connected to at least one light source. Illustratively, the floatable control buoy 25 is equipped with two light sources 32 which are each connected to the battery 33 and arranged on opposed sides of the housing 25d. Preferentially, the two light sources 32 are turned on in response to generation of the electrical trigger signal described above at FIG. 3.

Furthermore, the floatable control buoy 25 is preferably equipped with at least one grip. Illustratively, two lateral grips 25c are mounted to, or integrally formed with the housing 25d. The two lateral grips 25c are exemplarily embodied as grip handles, may alternatively however also be embodied e.g. as grasp lines. By way of example, the housing 25d may have a diameter of approximately 20 cm and a height of approximately 30 cm.

According to one aspect, the housing 25d has an ejection device accommodation 29 that is provided for accommodation of an ejection device 30. The ejection device 30 is preferably configured to eject the floatable control buoy 25 from the storage compartment 25b in the emergency mode. Illustratively, the ejection device 30 is implemented by a compression spring 30a that applies a predetermined spring force between the floatable control buoy 25, i.e. the housing 25d, and a partitioning wall 31 that separates the storage compartment 25b from the locking device compartment 28a.

It should be noted that provision of the housing 25d with the ejection device accommodation 29 is merely described by way of example and not for limiting the invention accordingly. Other implementations are readily available to the person skilled in the art and, therefore, likewise contemplated. For instance, instead of providing the ejection device accommodation 29 in the housing 25d of the floatable control buoy 25, it may be implemented in the partitioning wall 31 or by means of a separate component arranged between the partitioning wall 31 and the housing 25d.

According to one aspect, the housing 25d, i.e. the floatable control buoy 25, is further provided with a stud 25e. The stud 25e is preferably an integral part of, or rigidly mounted to, the floatable control buoy 25, i.e. the housing 25d. More specifically, the stud 25e is preferentially arranged on a side of the housing 25d, i.e. the floatable control buoy 25, that faces the partitioning wall 31 in the normal operation mode.

Preferably, the stud 25e protrudes in the normal operation mode through an opening 31a provided in the partitioning wall 31 into the locking device compartment 28a, wherein the locking device 28 is arranged. Illustratively, a stud accommodation 28b is provided in the locking device compartment 28a. By way of example, the stud accommodation 28b is formed in an associated locking device housing 28c that is rigidly mounted to the locking device compartment 28a and that preferentially accommodates the locking device 28.

However, it should be noted that provision of such a locking device housing 28c with the stud accommodation 28b is merely optional and may also e.g. be implemented by the locking device compartment 28a as such. Nevertheless, implementation of the locking device housing 28c is advantageous in that it allows to manufacture the locking device 28 as a separate modular component.

According to one aspect, the locking device 28 has a movable plunger 28e that is adapted for locking the stud 25e in the stud accommodation 28b in the normal operation mode. By way of example, the moveable plunger 28e may traverse the stud 25e via a respective opening provided in the stud 25e.

Preferably, the locking device 28 is further equipped with a solenoid 28d. The solenoid 28d is preferentially activatable for moving the moveable plunger 28e in the emergency mode such that the moveable plunger 28e releases the stud 25e.

In an exemplary operation of the life raft system 20, the floatable control buoy 25 is retained in the storage compartment 25b in the normal operation mode. Upon occurrence of an emergency, the locking device 28 is preferably automatically activated, preferentially in response to generation of the electrical trigger signal described above at FIG. 3. This results in activation of the solenoid 28d, which may be powered in the emergency mode by electrical power that is e.g. provided by the helicopter 10 of FIG. 2 and FIG. 3. Activation of the solenoid 28d in turn results preferably in a movement of the moveable plunger 28e from an associated locking position illustrated in FIG. 6 to a predetermined release position, in which the stud 25e is released. In other words, by moving the moveable plunger 28e into the release position, the stud 25e of the floatable control buoy 25 may be unlocked and the biased compression spring 30a preferentially applies the predetermined spring force to the housing 25d and flings the floatable control buoy 25 out of its storage compartment 25b and away from the helicopter 10 of FIG. 2 and FIG. 3, as exemplarily illustrated in FIG. 3.

REFERENCE LIST 1 rotary wing aircraft
1a multi-blade main rotor
1b, 1c, 1d, 1e rotor blades
1f rotor head
1g rotor shaft
1h landing gear
2 fuselage
2a cabin
2b cockpit
2c lower fuselage region
2d upper fuselage region
2e underside wall
3 tail boom
3a horizontal stabilizer
4 counter-torque device
4a tail rotor
5 vertical stabilizer
6 bumper
7 emergency floatation system
7a float bags
10 rotary wing aircraft
11 fuselage
11a lower fuselage region
11b underside wall
12a cabin
12b cockpit
13 emergency floatation system
13a float bags
14 water area
20 life raft system
21 storage container
21a fuselage facing side of container
21b lift raft compartment
21c compartment partitioning wall
22 inflatable life raft
23 life raft inflation device
24 life raft inflation device control unit
25 floatable control buoy
25a buoy connection line
25b buoy storage compartment
25c buoy grip
25d buoy housing
25e stud
26 ejection direction
26a ejection side
27 activation member cover
27a activation member
28 buoy locking device
28a buoy locking device compartment
28b stud accommodation
28c buoy locking device housing
28d solenoid
28e plunger
29 ejection device accommodation
30 ejection device
30a compression spring
31 partitioning wall
31a partitioning wall opening
32 light source
33 battery

What is claimed is:

1. A life raft system for an aircraft, comprising:
a storage container,
an inflatable life raft that is stored in the storage container in normal operation mode,
an inflation device for inflating the inflatable life raft in an emergency mode, and
a control unit for activating the inflation device in the emergency mode;
wherein the control unit comprises a floatable control buoy with an activation member that is operable for activating the inflation device, wherein the floatable control buoy is provided for operation at a predetermined distance remote from an associated aircraft in an emergency mode,
wherein the floatable control buoy is connected to a deployable connection line,
wherein the length of the deployable connection line is comprised in a range from 2 m to 5 m,
wherein the deployable connection line comprises an integrated electrical cable that is adapted for electrically connecting the activation member of the floatable control buoy to the inflation device, wherein the activation member is implemented as an electrical switch.

2. The life raft system of claim 1,
wherein the floatable control buoy comprises at least one grip.

3. The life raft system of claim 1,
wherein the floatable control buoy comprises at least one light source.

4. The life raft system of claim 1,
wherein the deployable connection line is rigidly mounted to an associated storage compartment that accommodates the floatable control buoy in the normal operation mode, for coupling the floatable control buoy to the associated storage compartment.

5. The life raft system of claim 4,
wherein the associated storage compartment is integrated into the storage container.

6. The life raft system of claim 4,
wherein an ejection device is provided that is configured to eject the floatable control buoy from the associated storage compartment in an emergency mode.

7. The life raft system of claim 4,
wherein a locking device is provided for locking the floatable control buoy in the associated storage compartment in the normal operation mode.

8. The life raft system of claim 7,
wherein the locking device comprises a movable plunger that is adapted for locking a stud in an associated accommodation in the normal operation mode, wherein the stud is an integral part of, or rigidly mounted to, the floatable control buoy.

9. The life raft system of claim 8,
wherein the locking device comprises a solenoid which is activatable for moving the moveable plunger in an emergency mode such that the moveable plunger releases the stud.

10. The life raft system of claim 8,
wherein the associated storage compartment is separated from a locking device compartment by means of a partitioning wall, wherein the stud protrudes in the normal operation mode through an opening provided in the partitioning wall into the locking device compartment.

11. The life raft system of claim 10,
wherein the ejection device comprises a compression spring that applies a predetermined spring force between the floatable control buoy and the partitioning wall.

12. An aircraft, in particular a rotary wing aircraft, with a fuselage and a life raft system according to claim 1, wherein the storage container of the life raft system is rigidly mounted to the fuselage.

* * * * *